Figure 1:
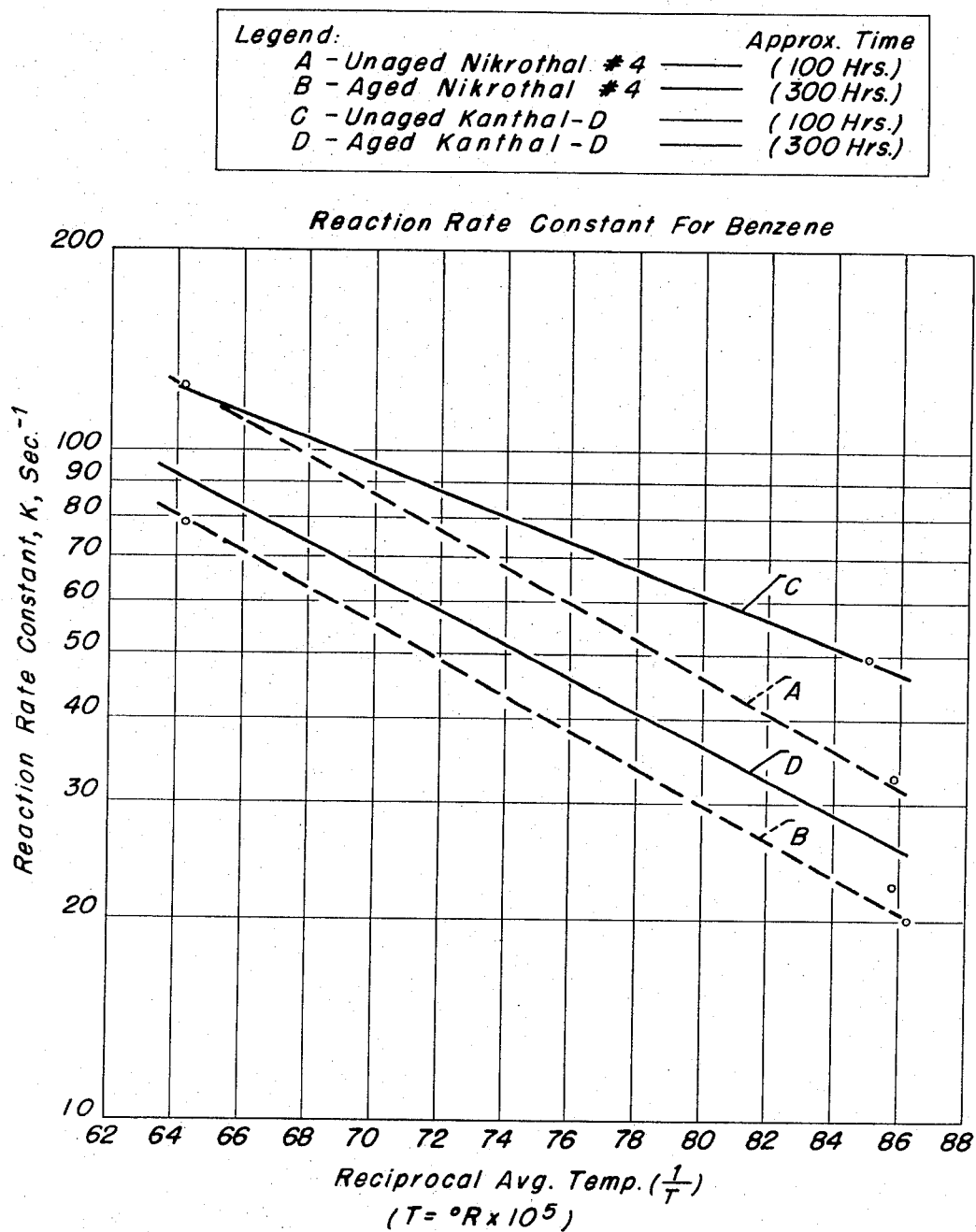

United States Patent [19]
Brewer

[11] 3,867,313
[45] Feb. 18, 1975

[54] NICKEL-FREE, ALL METAL, CATALYST ELEMENT

[75] Inventor: Gerald L. Brewer, Norwalk, Conn.

[73] Assignee: Universal Oil Products Company, Des Plaines, Ill.

[22] Filed: Nov. 1, 1972

[21] Appl. No.: 302,955

Related U.S. Application Data

[63] Continuation-in-part of Ser. No. 101,705, Dec. 28, 1970, abandoned.

[52] U.S. Cl. ............. 252/465, 252/466 B, 423/224, 204/47
[51] Int. Cl. ....................... B01j 11/06, B01j 11/08
[58] Field of Search .......... 252/465, 466 PT, 466 B, 252/477 R; 204/47; 423/224

[56] References Cited
UNITED STATES PATENTS

| | | | |
|---|---|---|---|
| 2,658,742 | 11/1953 | Suter et al. | 204/37 R X |
| 2,720,494 | 10/1955 | Suter | 204/37 R X |
| 3,254,966 | 6/1966 | Bloch et al. | 252/477 R X |

*Primary Examiner*—C. Dees
*Attorney, Agent, or Firm*—James R. Hoatson, Jr.; Philip T. Liggett; William H. Page, II

[57] ABSTRACT

An all metal, high temperature resistant, catalyst element is provided by plating or depositing a noble metal comprising platinum and/or palladium onto a base material which comprises primarily aluminum, chromium and iron. The nickel-free, aluminum containing base material appears to be of advantage for at least certain all metal catalyst element operations and also results in substantially lower first cost catalyst units.

5 Claims, 2 Drawing Figures

NICKEL-FREE, ALL METAL, CATALYST ELEMENT

This application is a continuation-in-part of my earlier filed application Ser. No. 101,705, filed Dec. 28, 1970 now abandoned.

This invention relates to providing an all metal, aluminum containing catalyst element, or unit, which is high temperature resistant and of particular advantage in effecting the catalytic incineration of noxious fumes such as may originate from industrial ovens, where such ovens are drying or baking enamels, varnishes, or other surface coatings. Additionally, these elements may well be used to advantage for hydrogen and oxygen recombination or for various specific chemical reactions which are to be catalytically promoted, as well as for the catalytic conversion of automobile engine exhaust gases to less noxious gaseous components. The present improved catalyst elements utilize a cleaned and etched base material for a noble metal coating, with the base essentially comprising: aluminum, chromium and iron, rather than making use of the heretofore utilized high nickel-chromium alloys or even any of the lower nickel content, less expensive "stainless steel" materials. As a result, there is an improved catalyst element with the particular advantage of being less expensive to make than presently known equivalent forms of all metal catalysts.

BACKGROUND OF THE INVENTION

In U.S. Pat. Nos. 2,658,742 and 2,720,494, there has been an earlier teaching of the use of all metal catalyst elements, as well as a teaching of the preparation of such types of catalysts, in connection with the treating of noxious gases and vapors. The advantage of a catalytic incineration of volatile combustible materials from industrial processing operations resides in the lowered heat requirements and the large resulting annual savings in fuel costs such that a higher installation cost can be quickly offset. For example, a thermal incineration operation for a gaseous stream may require a temperature in the range of 1100° to 1500° F.; while, on the other hand, the catalytic operation may be carried out at an inlet temperature range of from 600° to 700° F. the fuel savings are obvious.

The all metal catalyst units may be made in various forms, as for example, as one or more layers of coated screen of different gauges and meshes, short lengths of coated wire or ribbon in coiled form, coated mats of crinkled wire or of crimped strands of ribbon, etc. A popular form of unit has comprised a mat of crinkled or crimped thin and narrow ribbon placed between retainer screens of wire mesh. The elements have been made in various thickness, ranging from about 1 to 3 inches in thickness. Also, it has been of advantage to place the wire or mat portions of the elements into stainless steel frames such that they can be readily placed and held in an exhaust gas stream flow path.

The base materials for the noble metal coatings used in the heretofore known types of elements have been of special high nickel content alloys of various types, such as Chromel, Nikrothal, and Nickrome, (which are the tradenames for, respectively, an alloy of nickel and chromium and an alloy of nickel, chromium and iron). These alloys provided the desired requirements of having high thermal and electrical resistance in comparison to the usual or more widely used stainless steels that had lower nickel content.

At the present time, where air pollution is a much greater problem than it was twenty years ago, it is particularly important to carry out the incineration of a greater number of exhaust gas streams, as well as treat more types of fumes and gases, even though such streams would have been considered unobjectionable in an earlier era. As a result, it is of especial importance to provide more economical means as well as find efficient long-life catalysts, to effect the desired catalytic incinerations and it may be considered a particular object of the present invention to provide an improved lower cost base material for all metal catalyst elements and a resulting lower first cost for the installation of catalytic oxidation units.

In a broad aspect, the present invention is directed to an all metal oxidation catalyst comprising a base element and a coating of a noble metal, with said coating being at least one metal from the platinum group of metals, and said base element being a nickel-free alloy consisting essentially of iron, chromium and aluminum, and highly resistant to heat.

In another aspect, the present invention is directed to an all metal, nickel-free, catalyst element prepared by the steps of: (a) chemically cleaning a metallic base element comprising essentially iron, chromium and aluminum to remove adhered materials: (b) rinsing the element to remove cleaning solutions; (c) coating the base element with a noble metal deposit selected from the group consisting of platinum, palladium and mixtures thereof; (d) rinsing the coated element; and (e) then heating the resulting element in an air stream containing combustible vapors, in concentrations below the lower limit of explosibility for the mixture, at a temperature providing surface combustion of said vapors and thereby effecting a conditioning of the noble metal deposit into a porous active state.

As hereinbefore set forth, the present invention makes use of a lower cost, nickel-free, heat resistant base material which comprises aluminum, chromium and iron. Typically, the aluminum content will be of the order of 3 to 5 percent, the chromium content from 12 to 25 percent, and the balance essentially iron. Actually, cobalt, silicon, manganese, etc., may be present in small amounts of about 1 percent or less. Such types of alloys, which are nickel-free, are being presently marketed under the tradenames of Kanthal and Alkrothal, etc. This base metal may be in the form of wire, screen, wire-mesh, ribbon, or other physical form, depending upon the size of the catalyst unit desired, or the total surface area desired. In smaller units, there may be one or more layers of coated screening to comprise the catalyst unit, while on the other hand, where it is desirable to have substantial thickness and a large surface area that is coated to comprise the one or more catalyst elements used in an incineration installation, there may be a thick mat of crimped or crinkled ribbon which has been coated with the desired one or more platinum group metals. For convenience in handling, there can be thin and narrow crimped ribbon loosely and randomly compressed into a mat form and contained between two spaced screen members. Such mats will then appear similar to crinkled metal ribbon filter elements and be readily adapted for positioning in an exhaust gas stream flow path. Any one mat may provide several square feet of transverse area to the gas stream or, alternatively, a given passageway may be transversed by a plurality of mat-like elements which are of the order of 2 to 4 square feet that are, in turn, positioned in an edge-to-edge relationship in the form of a catalyst wall.

Prior to the deposition of the noble metal coating, there shall be a cleaning of the metal with a strong detergent cleaner or other suitable grease removing compound. Following a cleaning and rinsing, there is also preferably carried out a mild etching of the metal until there is some dullness or porosity provided on the surface of the base material, as for example, with a hydrochloric acid solution, or with hydrochloric acid together with ferric chloride. The etching operation may then be followed by further rinsing in water or in a mild detergent solution so as to be ready for the platinum metal group deposition. The platinum, palladium, or a mixture of platinum group metals may be deposited on the base metal by immersion plating or by electroplating; however, preferably, deposition is made by electroplating so as to effect a uniform coating of the desired metal, or metals, over the entire surface of the base element. For example, a solution may be prepared by adding platinic chloride in hydrochloric acid to provide a plating solution and the base element as a mat, screen, or other form, is immersed into the solution while being connected to the negative pole (cathode) of the electroplating operation. Carbon rods can be used to serve as the positive pole or anode and the plating operation is carried on for a period of time sufficient to obtain up to about 0.1 mm. thickness of coating. Generally, the time period will be less than about 5 minutes. Also, the operation should be carried out to preclude evolution of hydrogen from the plating solution, which solution is normally heated to be in the temperature range of 160° to 180° F.

Following the plating of the base element, there is a rinsing and drying prior to effecting a conditioning or activation of the noble metal surface on the coated element. The conditioning or activating operation may be effected in various ways; however, preferably, it is carried out by heating the element at a high temperature of the order of 900° to 1000° F. in the direct path of hot combustion gases from a burner means and in the presence of naphtha or hexane vapors which are continuously fed into the hot combustion gas stream between the burner flame and the coated element. This treating or conditioning provides a "preactivation" of the entire element and can be readily observed to be properly taking place in the firing operation by noting the spread of a bright red glow across the entire surface and through the thickness of the entire element. The resultant cooled surface is dull and of generally dark color that will have porosity and an extended surface area of "active centers".

Generally, the catalyst element, following the cleaning, electroplating and conditioning operations will result in an activated unit ready for commercial use. However, in certain instances where it is desired to have a heavier coat of the noble metal and an element with an insured long life in fume oxidizing service, there may be a "recoating" or a second coating added by the same electrolytic deposition procedure just described and the resulting recoated unit is subjected to the heretofore described rinsing, drying and conditioning operations. Also, in a preferred operation, the plating solution is recirculated through a cation exchange resin bed in order to remove dissolved cation impurities from the base metal and thus provide an improved controlled plating operation. Normally, one would expect the plating operation to be cationic; however, since none of the noble metals are removed from the plating solution by passage over the cation exchange resin, it appears that the plating is being carried out anionically. The solution may be passed through the exchange resin as a slip stream or all of the solution continuously circulated therethrough, or cycled over a predetermined time period. The acid form cation exchange resin may be a sulfonated co-polymer of styrene and divinyl benzene or, for example, a commercially available form of cation resin, such as Dowex 50 W, in a bead or spheroidal form.

Different types of coatings may be used to suit different types of oxidizing operations. For example, platinum or palladium alone may be of advantage in a particular incineration operation; while, in other instances, mixtures of platinum and palladium may be used to advantage. Generally, mixtures of platinum and palladium will provide greater tenacity to the base metal and high resistance to extreme high temperatures. In still other instances, ruthenium, thorium, iridium, or other platinum group metal, may be combined in small quantities along with platinum or palladium or a mixture thereof. Where an additional metal compound is desired in the noble metal coating alloy, there may be the addition of the metal salt to the plating bath so that there is a resulting alloying or mixing of the desired metal component into the electroplated surface. Generally, under proper conditions, the plating solution will be such as to provide the deposition of an approximate 0.1 mm. thickness of the plating in a period of 5 minutes or less.

The following descriptive information and data relates to the preparation of test type catalyst elements and to the activity testing thereof. Also, the resultant test data charted in the accompanying drawing is set forth in a manner to show that the catalyst elements utilizing the nickel-free base material (in accordance with the present invention) unexpectedly will result in catalyst units of somewhat higher activity for initial conversion as well as for aged catalysts. The nickel-free, aluminum containing substrate, catalytic units, in addition, will be of substantially lower first cost than any of the present all metal catalyst elements that have made use of conventional high nickel containing chromenickel alloys for the base metal.

COMPARATIVE RESULTS

For test purposes, small mats of crimped metal ribbon were specially made to fit into a test reactor made of 2 inches Schedule No. 10, type 316 stainless steel piping, with heating and insulating means provided therearound such that the reactor could operate to provide a minimum gas inlet temperature of 70° F. and a maximum inlet temperature of 1500° F. Thermocouples were mounted in combination with the reactor to sense entry and discharge temperature. The catalyst elements, or units, in each instance comprised: two mats of crimped ribbon each being 1¼ inches deep by 1⅞ in diameter. The alloy ribbon used in the mats, prior to crimping and working into a matted arrangement, was 1/16 inch wide and 0.005 inch thick.

The reactor inlet section also had a fuel inlet wick and a mixing baffle such that metered amounts of combustible liquid could be introduced into the reactor to combine with the incoming air stream. A syringe-type metering pump in turn connected with the wick such that a constant fuel vaporization rate was supplied to the reactor. The reactor outlet had valving means permitting part of the catalytically treated gas stream to be exhausted and part sent to an FIAD analyzer whereby there could be comparisons with inlet readings. The latter provided readings approximately linear to hydrocarbon concentrations and thus could be used to calculate conversions.

In one series of test operations, a "reference" catalyst unit was used in the aforedescribed reactor system for an approximate 300 hour period to effect the oxidation of benzene and n-heptane (the n-heptane was introduced during an interim period, i.e., after about 130 hours to approximately the 216 hour period). This "reference" catalyst was composed of two mats so as to be 2½ inches deep by 1⅞ inches diameter, as heretofore noted, and in this instance there was a palladium-platinum coating provided in an electroplating operation on Nikrothal No. 4 ribbon as a base material. (Nikrothal No. 4 comprises: 35 percent nickel, 19 percent chromium and the balance essentially iron.) The electroplating was carried out with a solution which was kept purified by circulation through a cation exchange resin. The actual test operation was carried out so as to be about 105 hours per week, with fuel injection being perhaps 42 hours per week. The unit was allowed to cool off over each week-end period. Gas flow, or air flow to the reactor together with benzene, was added by a syringe-pump in the manner heretofore described, and was at a gas flow rate of 250 std. Ft/min. and a resulting gas hourly space velocity (GHSV) of 48.0. Test operating temperatures were run at approximately 700° F., 900° F., and 1100° F. levels. Also, as heretofore noted, the testing was done in three phases, in that the catalyst was first subjected to benzene, then n-heptane, and then benzene again. Specific data from the results of the test operations is, in part, summarized in the following Table I:

In another series of test operations, a catalyst unit was prepared from crimped ribbon of Kanthal "D" (4.5 percent aluminum, 22 percent chromium, 0.5 percent cobalt and the balance essentially iron) that was electroplated with palladium-platinum and activated in the same manner and at the same time as for the "reference" (Nikrothal No. 4 base) catalyst unit. This Kanthal base catalyst was also subjected to the air-benzene flow in the same reactor at the same conditions heretofore set forth for the nickel containing "reference" catalyst. Specific data from the results of this set of test operations is, in part, summarized in the following Table II:

TABLE II

| Phase | On Stream (Time Hrs.) | Approx. Inlet Temp. (°F.) | Reciprocal of Average Temp. (1/20 Rx10⁵) | Conversion (%) | Residence Time t, sec × 10³ | Reaction Rate Constant K, sec⁻¹ | Solvent |
| --- | --- | --- | --- | --- | --- | --- | --- |
|  | 79.5 | 1100 | 64.1 | 86.4 | 16.7 | 119.6 | Benzene |
| 1 | 88 | 900 | 73.2 | 83.5 | 19.0 | 94.6 | Benzene |
|  | 105 | 700 | 85.2 | 66.4 | 22.3 | 49.2 | Benzene |
|  | 206 | 900 | 73.3 | 28.9 | 19.1 | 17.9 | n-Heptane |
| 2 | 214.5 | 1100 | 64.7 | 44.5 | 16.8 | 35 | n-Heptane |
|  | 274 | 1100 | 64.2 | 77.4 | 16.7 | 89.1 | Benzene |
| 3 | 282.5 | 700 | 85.9 | 39.6 | 22.3 | 22.5 | Benzene |
|  | 291 | 700 | 85.7 | 52 | 22.3 | 32.9 | Benzene |

For ease in observing the comparative aspects, the accompanying drawing provides certain sloping lines, i.e., Arrhenius plots, such that there is shown the comparison of the averaging of the calculated reaction rate constants for the oxidation of benzene, over the extended period of time, (which time period included the interim n-heptane oxidation). The lines "A" and "C", indicate comparisons at the end of approximately 100 hours of operation, where only benzene had been oxidized on the catalyst surfaces. However, each of the types of catalyst units were further subjected to substantially identical test procedures over continuing periods of time, and the comparison lines "B" and "D", show results after some approximate 300 hours of test operations for each catalyst, in which case each catalyst had also been subjected to n-heptane oxidation, as well as the benzene oxidations.

Lines "A" and "B" in the drawing, or chart of FIG. 1, are for the results of the catalyst prepared with a Nikrothal No. 4 base, at the end of approximately 100 hours and 300 hours, respectively.

Lines "C" and "D" of the same FIG. 1 are for the catalyst prepared with a Kanthal-D base at the end of similar approximate 100 hour and 300 hour periods.

Figure 2:
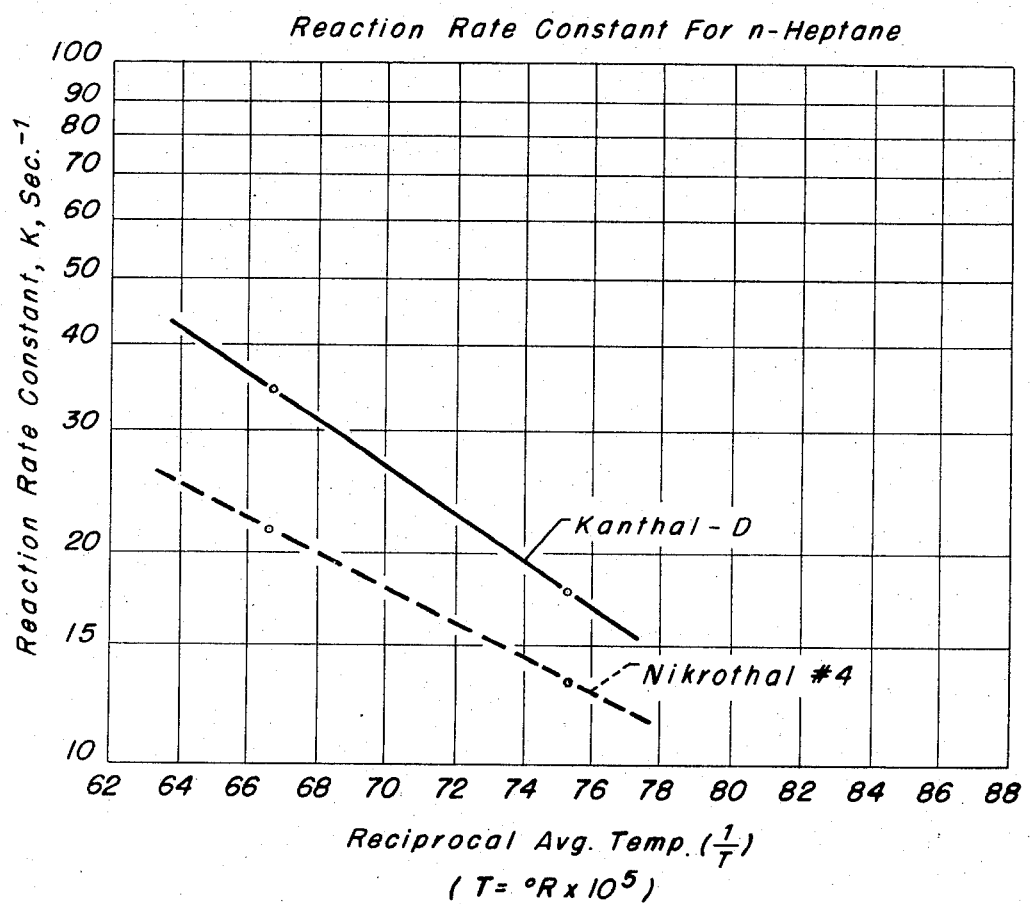

FIG. 2 of the drawing shows Arrhenius plots for data

TABLE I

| Phase | On Stream (Time Hrs.) | Approx. Inlet Temp. (°F.) | *Reciprocal of Average Temp. (1/°Rx10⁵) | Conversion (%) | Residence Time t, sec × 10³ | **Reaction Rate Constant K, sec⁻¹ | Solvent |
| --- | --- | --- | --- | --- | --- | --- | --- |
|  | 76.5 | 1100 | 64.1 | 87.4 | 16.7 | 124.3 | Benzene |
| 1 | 85 | 900 | 73.4 | 74.3 | 19.1 | 71.2 | Benzene |
|  | 102 | 700 | 85.8 | 51.7 | 22.3 | 32.6 | Benzene |
| 2 | 199.5 | 900 | 73.3 | 22.2 | 19.1 | 13.2 | n-Heptane |
|  | 208 | 1100 | 64.6 | 30.7 | 16.8 | 21.8 | n-Heptane |
|  | 276 | 700 | 86.3 | 37.9 | 22.4 | 21.2 | Benzene |
| 3 | 289.5 | 900 | 73.6 | 66.4 | 19.1 | 57 | Benzene |
|  | 293 | 1100 | 64.3 | 73.2 | 16.7 | 78.9 | Benzene |

*Reciprocal of Average Temperature = 1/T, where T = °R × 10⁵
**Reaction rate constant = K = −ln 100/100−C/t plotted from the last days of the test procedure for Phase 2, where the "reference" and "test" catalysts were being used to oxidize n-heptane. It should be noted that the conversion of the Kanthal-D catalyst is better than that for the Nikrothal No. 4 catalyst.

It is believed particularly significant to find that the nickel-free, aluminum containing, base catalyst unit provides better activity when "aged" than does the aged Nikrothal No. 4 base catalyst, in addition to also finding better results as an "unaged" catalyst. Again, it is to be noted that the results were unexpected in view of earlier test work, and the general presumption based on earlier trial coatings and experimental work, that had indicated high nickel content base materials were necessary for good plating results and/or catalyst activity. For example, some earlier test work was carried out utilizing a base material of stainless steel ribbon that was substantially nickel-free in comparison with a mat of nickel containing Chromel "C" ribbon. Specifically, the nickel-free stainless steel was of the Type 434-A which consists of 14–18 percent chromium, about 1 percent copper, 0.65 to 0.95 percent silicon and the balance essentially iron and the Chromel "C" comprises a material which is of the order of 60 percent nickel, 16 percent chromium and the balance essentially iron. The test mat incorporating the Type 434-A stainless steel had the ribbon in short curled lengths of ribbon, with these "curls" being perhaps of about 3/16 to 1/4 inch in diameter and in a form similar to the curls adapted for use in the pads or balls that cutomarily serve as the stainless steel kitchen scouring pads. The comparison mat incorporating the Chromel "C" ribbon had short lengths of crimped 1/16 inch wide ribbon in a randomly packed arrangement, such as heretofore described. In each case the total mat thickness was 3.75 inches. (Three 1¼ inches thick mats of Chromel "C" ribbon were used to make the 3.75 inches thickness.) Both mats of the base ribbon were subjected to the same type of "twice coated" plating and conditioning procedures as also heretofore described in connection with the preferred method for coating the present form of catalyst. The precious metal coating by the electroplating procedure was a palladium-platinum mixture, with the same percentage of each component being utilized for each of the test mats. The test results from the oxidation of methane over the respective mats are shown in the following Table III.

The conversion results show that the substantially nickel-free, stainless steel mat of the Type 434-A was only about 38 percent as efficient as the mat with the Chromel "C" ribbon for a base material. It should be noted, however, that the surface area measurements made with respect to the amount of ribbon in each mat showed the mat with the Chromel "C" material was more densely packed so as to have about 300 sq. ft. per cubic foot as compared to about 170 sq. ft. per cubic foot of the Type 434-A. Upon taking this aspect into consideration, there could be reasoned that the mat of Chromel "C" ribbon should show a corrected conversion of 53.5 × 170/300 or 30.4%. This "corrected" conversion is, of course, still substantially greater than that for the Type 434-A stainless steel. In the making of a comparison between the Kanthal-D base mats and the Type 434-A mat, it would appear that the latter would also not provide the same activity or conversion as the Kanthal-D mat base material. This statement is based on the heretofore set forth results of Kanthal-D as compared with Nikrothal 4 and the additional fact that the latter material normally provides catalytic elements which compare substantially equally with Chromel "C" elements as to activity, although the latter, with higher nickel content, are frequently used in conversions which will be subjected to higher temperature conditions.

Although no test data is herewith provided, it is to be further set forth and noted that a commercial sized mat (12 by 18 inches by 1¼ inches thick) was prepared of crimped 1/16 inch × 0.005 Alkrothal ribbon and was cleaned and coated in the heretofore described manner so as to have a coating of something less than 0.1 mm thickness of palladium-platinum. It is also to be noted that when the mat was subjected to the heretofore described activating procedure, in the presence of a hot combustion gas stream from a burner flame and added hexane vapors oxidized on the catalyst surface, there was a spread of the bright red color over the catalyst mat in a manner entirely similar to that observed in activating a catalyst mat utilizing a Chromel D or Nikrothal-4 ribbon as a base material.

I claim as my invention

1. An all metal oxidation catalyst element comprising a base element and a coating of a nobel metal, said coating being at least one metal from the platinum group and said base element being a nickel free alloy consisting essentially of aluminum, chromium and iron, and highly resistant to heat.

2. The all metal catalyst of claim 1 further characterized in that the noble metal coating on the alloy base element is in a porous, active state.

3. The all metal catalyst of claim 1 further characterized in that aluminum is present in an amount of from about 3 to about 5 percent, chromium in an amount from 12 to about 25 percent and the balance is essentially iron.

4. The all metal catalyst of claim 1 further characterized in that said noble metal is electroplated onto said alloy base element.

5. The catalyst element of claim 1 further characterized in that said element is made of wire or ribbon pieces of said alloy and maintained in the form of a gas permeable mat that is electroplated with a coating of at least one metal from the platinum group of metals.

TABLE III

| Ribbon | Gas Press. (Psig) | Gas Vel. (Ft./Min.) | Temp. °F. In | Temp. °F. Out | Concentration $CH_4$-In | Concentration $O_2$ | Conversion |
|---|---|---|---|---|---|---|---|
| Type 434-A | 84 | 70 | 950 | 1050 | .91% | 2.5% | 19.8% |
| Chromel "C" | 85 | 66 | 950 | 1200 | 1.4% | 2.5% | 53.5% |

* * * * *